(12) United States Patent
Westphal (10) Patent No.: US 7,925,691 B2
(45) Date of Patent: Apr. 12, 2011

(54) SYSTEM AND METHOD FOR FACILITATING EASE OF USE OF A WEB PAGE USER INTERFACE

(75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 462 days.

(21) Appl. No.: 11/507,297

(22) Filed: Aug. 21, 2006

(65) Prior Publication Data
US 2008/0046507 A1 Feb. 21, 2008

(51) Int. Cl.
*G06F 15/16* (2006.01)
(52) U.S. Cl. .......................... 709/203; 709/218
(58) Field of Classification Search .................. None
See application file for complete search history.

(56) References Cited

U.S. PATENT DOCUMENTS

| | | | |
|---|---|---|---|
| 6,014,638 A | 1/2000 | Burge et al. | |
| 6,519,571 B1 | 2/2003 | Guheen et al. | |
| 6,959,319 B1 | 10/2005 | Huang et al. | |
| 7,389,917 B2 * | 6/2008 | Abraham et al. | 235/382 |
| 7,574,483 B1 * | 8/2009 | Alger et al. | 709/217 |
| 2003/0204439 A1 * | 10/2003 | Cullen, III | 705/11 |
| 2005/0228775 A1 * | 10/2005 | Nilsen et al. | 707/2 |
| 2006/0047701 A1 * | 3/2006 | Maybury et al. | 707/104.1 |
| 2007/0112792 A1 * | 5/2007 | Majumder | 707/100 |
| 2007/0185884 A1 * | 8/2007 | Kantamneni | 707/10 |

OTHER PUBLICATIONS

Yahoo! Shopping, as captured by archive.org on Jun. 1, 2005. http://web.archive.org/20050531014134/shopping.yahoo.com/.*

* cited by examiner

*Primary Examiner* — Ario Etienne
*Assistant Examiner* — Clayton R Williams
(74) *Attorney, Agent, or Firm* — Greenberg Traurig, LLP; Mark R. Galis; Gary R. Jarosik (57) ABSTRACT

A system and method for facilitating ease of use of a user interface which monitors usage of a Web page to discern usage patterns associated with the Web page. The discerned usage patterns associated with the Web page are then used to form a plurality of user interface types each functioning to provide to the Web page predetermined content. A user selects one of the plurality of user interface types whereupon, in response to a subsequent request from the user to view the Web page, the Web page is provided to the user with the select one of the plurality of user interface types.

6 Claims, 7 Drawing Sheets

SYSTEM AND METHOD FOR FACILITATING EASE OF USE OF A WEB PAGE USER INTERFACE

BACKGROUND

The following relates generally to a system and method for facilitating ease of use of a Web page user interface.

In the art, Web pages are typically used to display and/or provide a means for a user to access one or more of services, products, information, data, news, functionality, and/or the like (individually and collectively referred to hereinafter as "content") that is made available via a Web site. Generally, the user interfaces associated with Web pages are designed without regard to what content customers will actually use. Thus, it is not uncommon for a user interface of a Web page to present to a user content that will only be relevant to a small percentage of visitors to a Web site.

To ease access to content offered via a Web site, some systems utilize "liquid design," that is, a Web page is scaled at a resolution and size so as to fit the content of the Web page into the horizontal constraints of a browser window. To this end, the Web page is displayed with the content within the Web page being wrapped down the screen. As the browser window size is increased, less wrapping occurs and the content of the Web page expands to fill the full width of the browser window. While "liquid design" thus provides a means to facilitate access to content, it will be evident that "liquid design" fails to address issues with respect to relevancy of the content to various users.

For the purpose of presenting to an individual user within a Web page content that is supposed to be more relevant to the needs of that particular, individual user, U.S. Pat. No. 6,959,319 describes customizing a Web page by sensing a user's access of objects included in the Web page or objects that are specified by the user in advance. More particularly, the described system requires that the user register his/her browser with a proxy server that sits between the browser of the user and a Web site. When the user then accesses a designated Web site, the proxy server intercepts Web pages downloaded from the designated Web site and uses a user profile to filter the downloaded Web pages prior to presentation of the downloaded Web pages within the browser of the user. As will be appreciated, this described system and method for customizing Web pages to particular, individual users has numerous disadvantages including, but not limited to, being costly to implement and being burdensome to users in at least its configuration requirements.

A system and method having similar disadvantages is also described in U.S. Pat. No. 6,014,638 which likewise functions to dynamically customize content and presentation of content for individual users by monitoring and recording navigational choices of that individual user.

Accordingly, a need exists for a system and method for facilitating ease of use of a Web page user interface which overcomes at least the disadvantages above noted.

SUMMARY

To address this and other needs, described hereinafter is a system and method for facilitating ease of use of a Web page user interface which, among other things, is relatively less costly to implement and relatively simpler for a user to utilize. For this purpose, the system and method described hereinafter functions to generally provide for a Web page a plurality of user interfaces having predetermined content. By way of example, the plurality of user interfaces for a Web page may include a first user interface that provides access to a first set of predetermined Web page content and a second user interface that provides access to a second set of predetermined Web page content. The second set of Web page content may include at least a subset of the first set of Web page content. For ease of use, a user interface for a Web page may then be selected from the plurality of user interfaces, for example by being chosen by a user or suggested to a user, to thereafter be used as a default user interface for that Web page.

For predetermining content to include within each of the plurality of user interfaces, historical information concerning usage of various functionalities offered via a Web page by individuals or groups of users may be utilized. More particularly, by analyzing a frequency with which certain individuals or groups of users utilize various functionalities offered via a Web page, each of the plurality of user interfaces of the Web page may be particularly tailored to the needs of a user or a user that is within a particular group of users. For example, a group of users may use the Web page searching functionality but may not use functionality of a Web page to purchase found items online instead electing to purchase items by means of an alternative method (e.g., by fax, by phone, or in person). Thus, a user within this group of users may be presented with a user interface for the Web page wherein all online order related functionality is removed from the predetermined content of the Web page. Similarly, a user interface for a Web page may be designed to omit from its predetermined content functionality associated with will-call ordering and credit cards for advantageous presentation to a user within a group of users that purchase all of their items online for shipment and which use open account billing methods.

A better understanding of the objects, advantages, features, properties and relationships of the systems and methods described hereinafter will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the systems and methods described hereinafter reference may be had to preferred embodiments shown in the following drawings in which:

FIG. 3 is a screen shot illustrating the exemplary Web home page of FIG. 2 with a first user interface having a predetermined first set of content being used as a default user interface;

FIG. 6 is a screen shot illustrating an exemplary Web order page with a first user interface having a predetermined first set of content being used as a default user interface.

DETAILED DESCRIPTION

Figure 1:
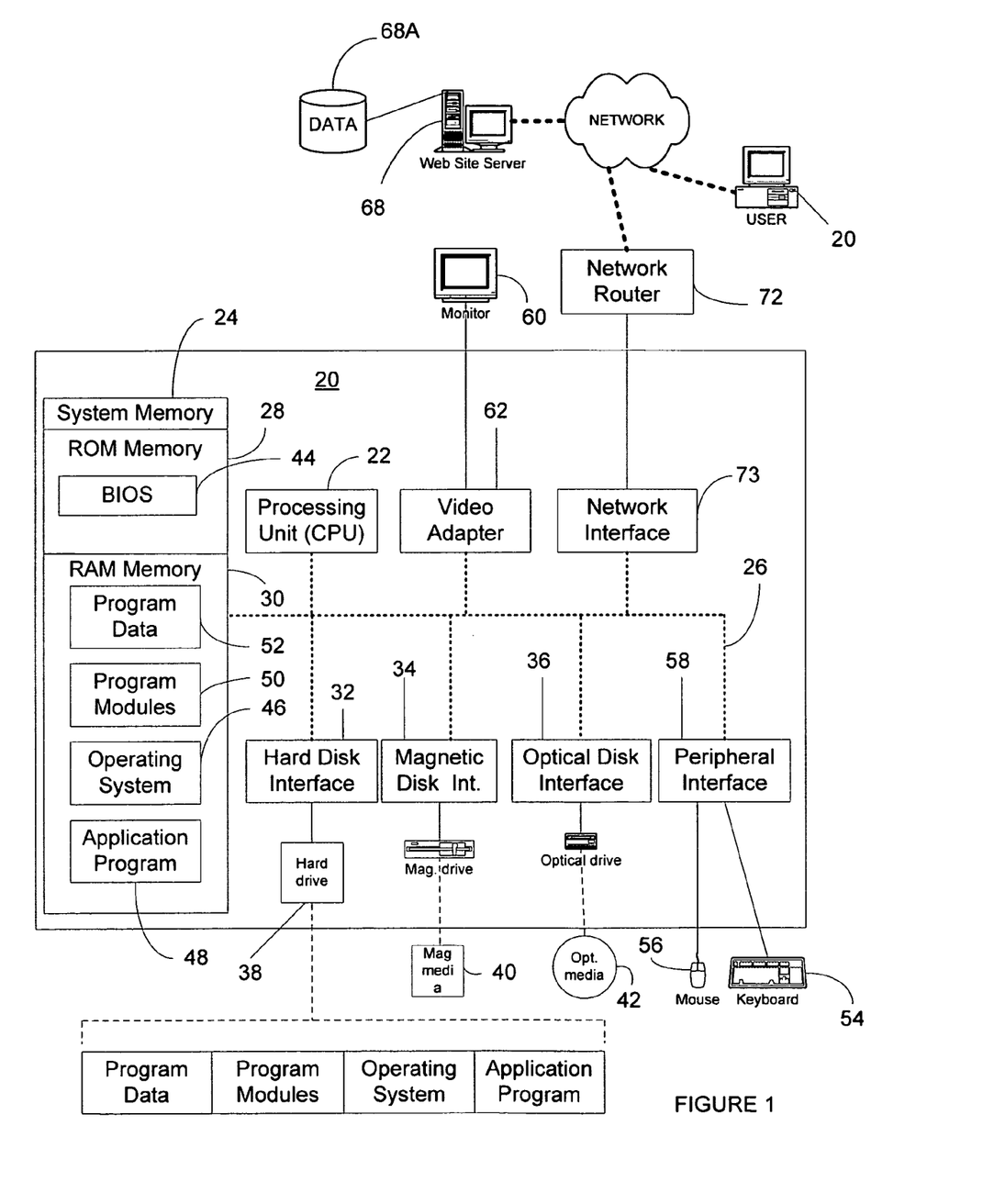
FIG. 1 is a block diagram illustrating an exemplary computer system in which the principles of the described invention may be employed.

Turning to the drawings, wherein like reference numerals refer to like elements, an exemplary system and method for facilitating ease of use of a Web page user interface is now described. In particular, as illustrated in FIG. 1, the system and method will be described in the context of a plurality of processing devices linked via a network, such as the World Wide Web or the Internet. In this regard, a processing device 20, illustrated in the exemplary form of a computer system, is provided with executable instructions to, for example, provide a means for a user to access a remote processing device in the exemplary form of a Web server 68 to thereby retrieve Web pages and perform Web page related operations. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory 25 bus, a peripheral bus, and/or a local bus using any of a variety of well-know or future developed bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

An end-user may enter commands and information into the processing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted above, the processing device 20 may also utilize logical connections to the Web server 68 having associated data repository 68A. In this regard, the Web server 68 may, like processing device 20, be any type of device having processing capabilities. Again, it will be appreciated that the Web server 68 need not be implemented as a single device but may be implemented in a manner such that the tasks performed by the Web server 68 are distributed to a plurality of processing devices linked through a communication network For performing tasks as needed, the Web server 68 may include many or all of the elements described above relative to the processing device 20. By way of further example, the Web server 68 may include the executable instructions for determining which of various user interfaces having predetermined content are to be provided to a user. The Web server 68 may also include programming for assisting in predetermining the content that is to be provided to the various user interfaces. Communications between the processing device 20 and the Web server 68 may be exchanged via a further processing device, such a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the Web server 68.

For facilitating ease of the services and functionalities offered via the Web server 68, a Web page presented to a user via the Web server 68 is provided with one of a plurality of user interfaces each having predetermined content. To predetermine which content is to be included with the user interface of a Web page, the Web server 68 tracks and stores, for example in data repository 68A, information concerning usage of various functionalities offered via a Web page by users or groups of users. It will be appreciated that tracking of usage of a Web page by users or groups of users may be facilitated by requiring a user to log-in to the Web site, by placing a cookie onto a computer of a user that similar functions to identify a user to the system, etc. Furthermore, membership of a user within a group of users may be explicit, for example by a user providing information during a registration process with the Web site, or may be inferred from actions (or non-actions) that a user takes with respect to the Web site content. Thus, by analyzing a frequency with which individuals or certain groups of users utilize various functionalities offered via the Web page, each of the plurality of user interfaces of the Web page may be particularly tailored to the needs of a user or a user that is within a particular group of users. In this manner, since a tailored user interface will reduce complexity of a Web page, the tailored user interface is more likely to provide a user with a more positive usage experience which, in turn, is more likely to provide more customer conversion to the online channel, provide more online customer retention, and provide more sales.

By way of example, by monitoring Web site usage it may be determined that there exists a group of users that use the Web page searching functionality but do not use functionality of a Web page to purchase found items online, instead electing to purchase items by means of an alternative method (e.g., by fax, by phone, or in person). Thus, to facilitate ease of use of the Web site, a user interface may be developed for this group of users wherein all online order related content functionality is removed from the predetermined content of the Web page(s) offered via the Web server 68. Similarly, a user interface for a Web page may be designed to omit from its predetermined content functionality associated with will-call ordering and credit cards for advantageous presentation to users within a group that it is seen purchase all of their items online for shipment and which use open account billing methods.

Figure 2:
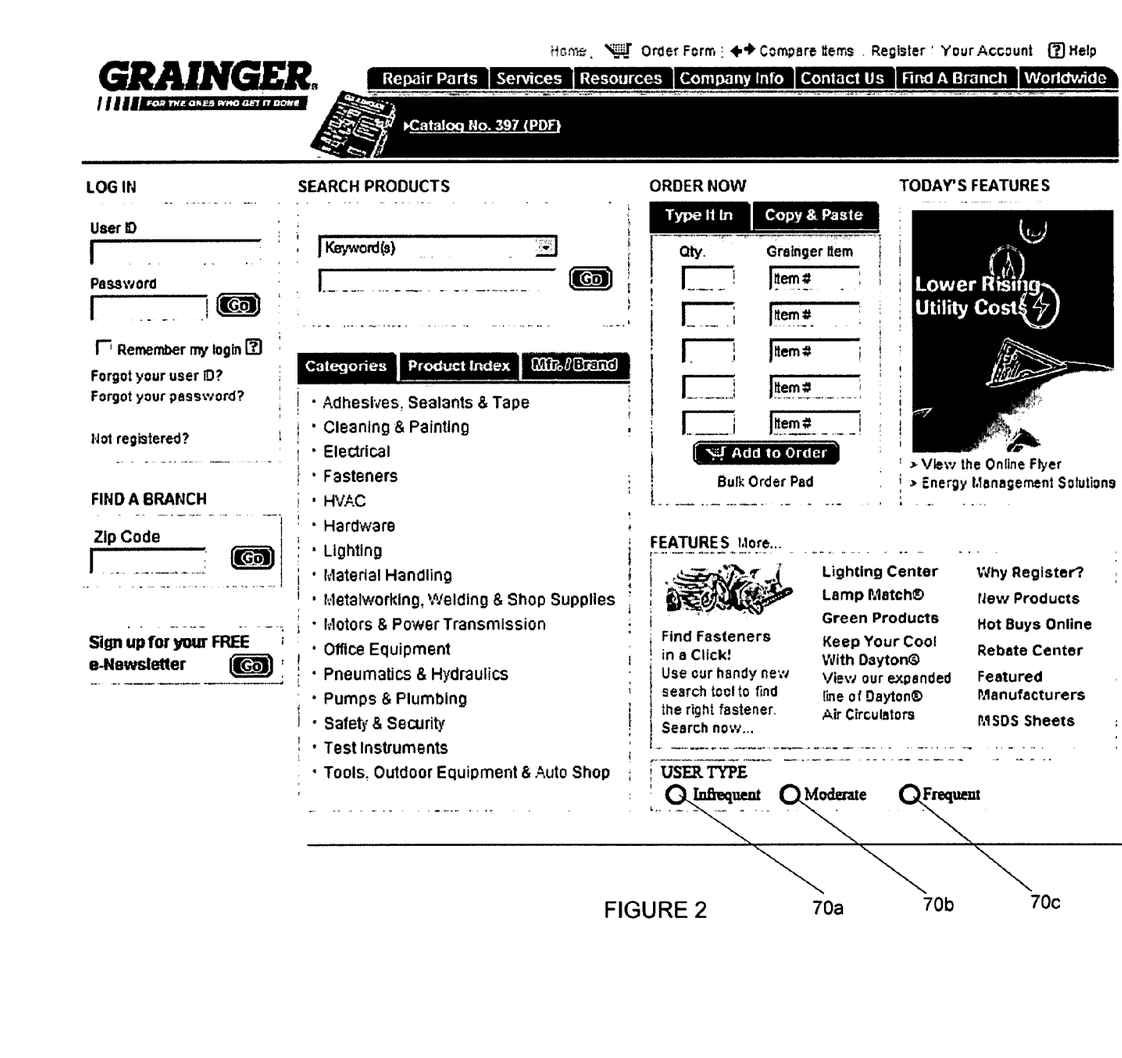
FIG. 2 is a screen shot illustrating an exemplary Web home page including means for a user to select a desired one of a plurality of user interfaces for that Web page.

To provide a means for a user to select which of a plurality of user interfaces the user desires to be presented with in connection with a Web page or Web pages offered via the Web server 68, i.e., to allow a user to choose a graphical user interface that the user thinks will best suit their needs, graphical user interface selection elements 70 may be presented to the user. By way of example, FIG. 2 illustrates selection elements 70*a*-70*c* by which a user may indicate to the Web server 68 that the user considers himself or herself to be an infrequent user of the Web site 70*a*, a moderate user of the Web site 70*b*, or a frequent user of the Web site 70*c*. The graphical user interface selection elements 70 may be presented to the user by means of a drop down menu, radio selection buttons, etc. without limitation.

Figure 4:
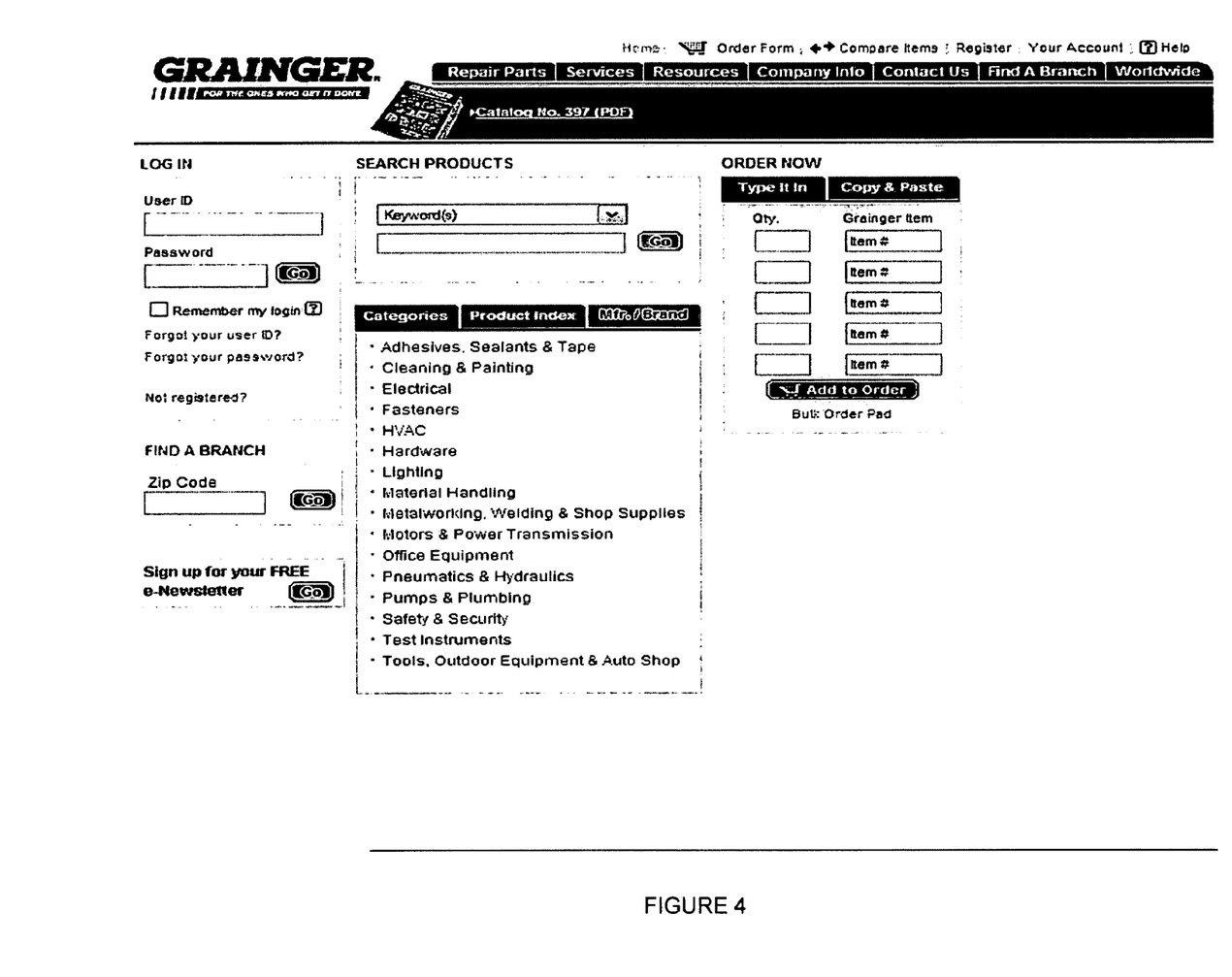
FIG. 4 is a screen shot illustrating the exemplary Web home page of FIG. 2 with a second user interface having a predetermined second set of content being used as a default user interface.
Figure 5:
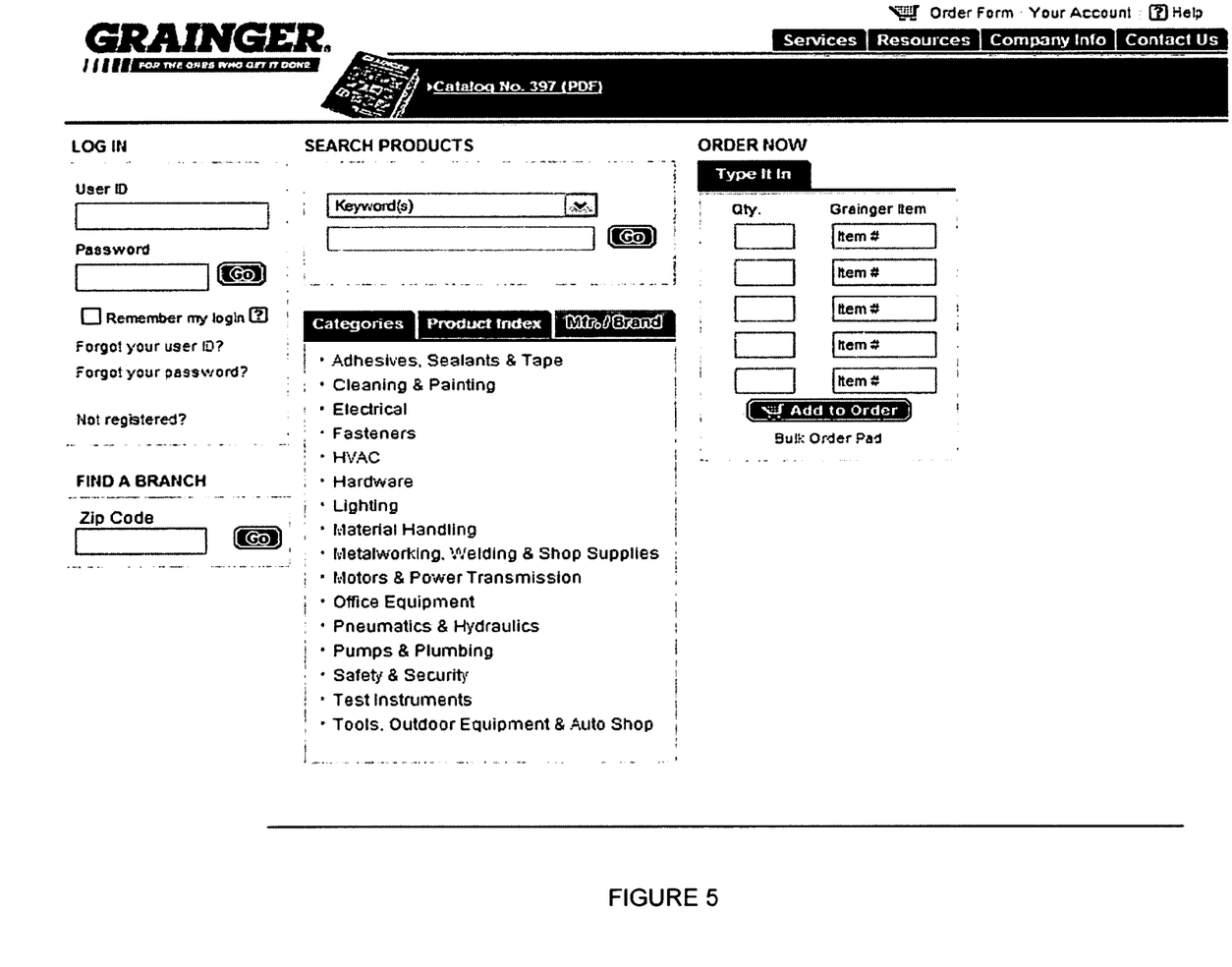
FIG. 5 is a screen shot illustrating the exemplary Web home page of FIG. 2 with a third user interface having a predetermined third set of content being used as a default user interface.

In the example provided, if a user indicates that they are a frequent user of the Web site offered via the Web server 68, the user may be presented with a Web page or Web pages wherein all of the content offered via a particular Web page is available to the user as illustrated in the exemplary Web home page of FIG. 3. If a user indicates that they are a moderate user of the Web site offered via the Web server 68, the user may be presented with a Web page or Web pages having predetermined content that is determined to be appropriate for a moderate user of the Web site (determined, for example, by monitoring usage of the Web site by various users over time as noted above). In the exemplary user interface for a moderate user illustrated in the Web home page of FIG. 4, the predetermined content offered via the user interface determined to be appropriate for a moderate user of the Web site is a subset of the predetermined content of the user interface determined to be appropriate for a frequent user. Similarly, if a user indicates that they are an infrequent user of the Web site offered via the Web server 68, the user may be presented with a Web page or Web pages having predetermined content that is determined to be appropriate for an infrequent user of the Web site. In the exemplary user interface for an infrequent user illustrated in the Web home page of FIG. 5, the predetermined content offered via the user interface determined to be appropriate for an infrequent user of the Web site is a subset of the predetermined content of the user interface determined to be appropriate for a moderate user.

Figure 7:
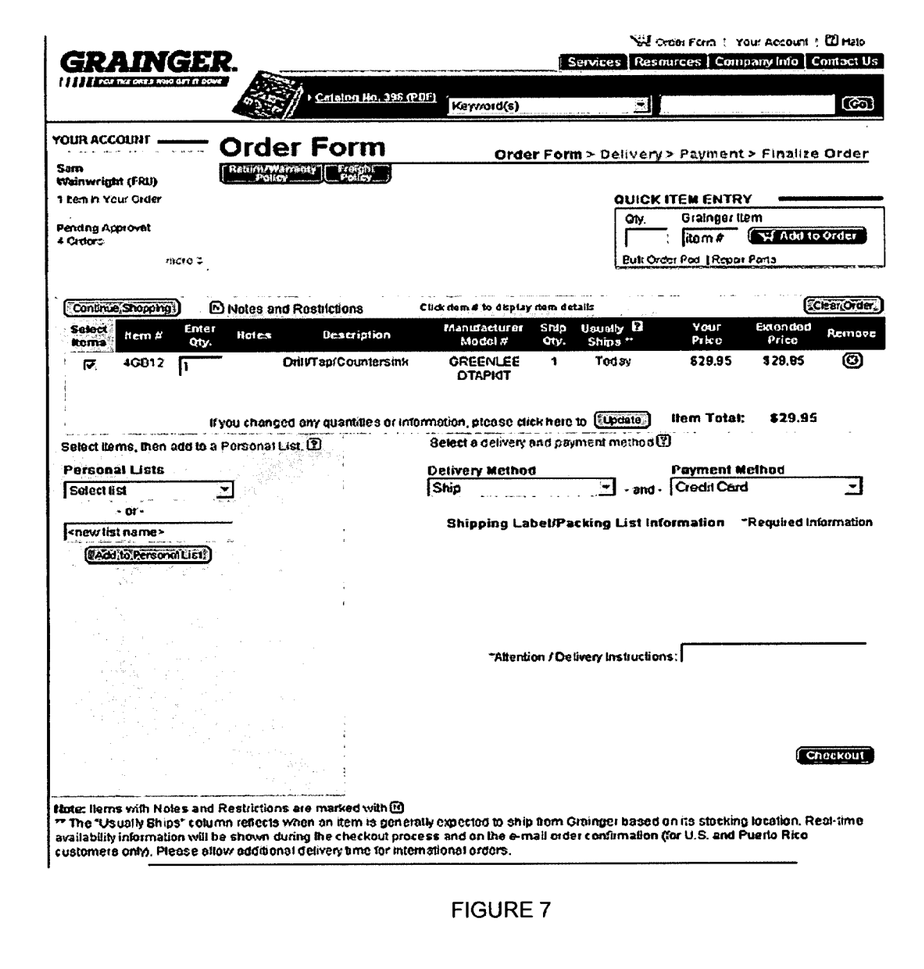
FIG. 7 is a screen shot illustrating the exemplary Web order page of FIG. 6 with a second user interface having a predetermined second set of content being used as a default user interface.

The specified user interface may be applied to a specific Web page or may be applied across one or more Web pages offered via the Web site as appropriate. For example, an indicated frequent user, upon accessing a Web order page, may be presented with a user interface having predetermined content determined to be appropriate for a frequent user as illustrated in FIG. 6 while an indicated infrequent user, upon accessing the Web order page, may be presented with a user interface having predetermined content determined to be appropriate for an infrequent user as illustrated in FIG. 7. As before, in the example illustrated in FIGS. 6 and 7, the predetermined content of the user interface determined to be appropriate for an infrequent user is shown as being a subset of the predetermined content of the user interface determined to be appropriate for a frequent user, e.g., the user interface determined to be appropriate for an infrequent user may be a Web server 68 filtered version of the user interface determined to be appropriate for a frequent user. While the Web server 68 may function to filter the content of a Web page to provide a user interface having predetermined content, it will be appreciated that various other mechanism may be used to achieve this same goal without limitation, e.g., different versions of the same Web page may be stored in the data repository 68A and delivered to users as appropriate. It will also be appreciated that the user interfaces need not have overlapping content but may, instead, provide a totally different look and feel depending upon the intended end user, e.g., a first version of the user interface using graphics for users within a young age group and using words for users within an older age group.

In a further embodiment, the system may function to suggest for selection by a user a particular user interface. For example, if it is determined from monitored usage of the Web site that a user only utilizes certain of the content to the exclusion of other offered content, the Web site may be programmed to suggest to the user, for example via a pop up with a selection element, that they select one of the plurality of user interfaces as a default for one or more Web pages offered via the Web server 68, i.e., the one of the user interfaces that offers content which is considered to be most likely to be tailored to the user based upon their discerned usage patterns.

While specific embodiments of the invention have been described in detail, it will be appreciated by those skilled in the art that various modifications and alternatives to those details could be developed in light of the overall teachings of the disclosure. For example, while the illustrated example depict user interfaces determined to be appropriate for frequent, moderate, and infrequent users of the Web site, other types of pre-configured user interfaces may be tailored, by way of example only, to groups of users within a certain age range or geo-location, that ship only, that do will-call only, that do research and browsing only, etc. It will also be understood that the various steps described herein need not be performed in the exact order set forth within this document and that the various processes described herein may be implemented using software, hardware, or both. Accordingly, the particular arrangements disclosed are meant to be illustrative only and not limiting as to the scope of the invention which is to be given the full breadth of the appended claims and any equivalents thereof.

All patents, patent applications, and other references cited within this document are hereby incorporated by reference in their entirety.

What is claimed is:

1. A method for facilitating ease of use of a user interface, comprising:

monitoring usage of a Web page having a plurality of predetermined content functionalities to discern usage patterns associated with each of the plurality of predetermined content functionalities of the Web page;

using the discerned usage patterns associated with each of the plurality of predetermined content functionalities of the Web page to form a plurality of different user interface types wherein each of the plurality of different user interface types is associated with a unique subset of the plurality of predetermined content functionalities of the Web page and a one of a plurality of user type categorizations;

monitoring usage by a user of a Web site including the Web page to thereby infer for the user a membership within a one of plurality of user type categorizations;

presenting to a user via a user interface element a suggestion that a user elect to have the Web page presented to the user using the one of the plurality of different user interface types that is associated with the one of the plurality of user type categorizations of which the user was inferred to be a member of; and in response to the user interacting with the user interface element to thereby indicate an election to have the Web page presented to the user using the one of the plurality of different user interface types that is associated with the one of the plurality of user type categorizations of which the user was inferred to be a member of providing the Web page to the user with the Web page having removed therefrom all of the plurality of predetermined content functionalities excepting those of the plurality of predetermined content functionalities included within the unique subset of the plurality of predetermined content functionalities of the Web page that was associated with the one of the plurality of different user interface types that is associated with the one of the plurality of user type categorizations of which the user was inferred to be a member of.

2. The method as recited in claim 1, comprising storing on a device associated with the Web server a first version of the Web page that includes a first subset of the plurality of predetermined content functionalities of the Web page determined to be appropriate for a first one of the plurality of different user interface types and a second version of the Web page that includes a second subset of the plurality of predetermined content functionalities of the Web page determined to be appropriate for a second one of the plurality of different user interface types.

3. A computer readable media in the form of a non-transitory, physically embodied memory device having embedded instructions executable by a Web server for facilitating ease of use of a user interface, the instructions performing steps comprising:

monitoring usage of a Web page having a plurality of predetermined content functionalities to discern usage patterns associated with each of the plurality of predetermined content functionalities of the Web page;

using the discerned usage patterns associated with each of the plurality of predetermined content functionalities of the Web page to form a plurality of different user interface types wherein each of the plurality of different user interface types is associated with a unique subset of the plurality of predetermined content functionalities of the Web page and a one of a plurality of user type categorizations;

monitoring usage by a user of a Web site including the Web page to thereby infer for the user a membership within a one of plurality of user type categorizations;

presenting to a user via a user interface element a suggestion that a user elect to have the Web page presented to the user using the one of the plurality of different user interface types that is associated with the one of the plurality of user type categorizations of which the user was inferred to be a member of; and in response to the user interacting with the user interface element to thereby indicate an election to have the Web page presented to the user using the one of the plurality of different user interface types that is associated with the one of the plurality of user type categorizations of which the user was inferred to be a member of providing the Web page to the user with the Web page having removed therefrom all of the plurality of predetermined content functionalities excepting those of the plurality of predetermined content functionalities included within the unique subset of the plurality of predetermined content functionalities of the Web page that was associated with the one of the plurality of different user interface types that is associated with the one of the plurality of user type categorizations of which the user was inferred to be a member of.

4. The readable media as recited in claim 3, wherein the instructions read from a device associated with the Web server one of a first version of the Web page pre-stored on the device where the first version of the Web page includes a first subset of the plurality of predetermined content functionalities determined to be appropriate for a first one of the plurality of different user interface types and a second version of the Web page pre-stored on the device where the second version of the Web page includes a second subset of the plurality of predetermined content functionalities determined to be appropriate for a second one of the plurality of different user interface types.

5. The readable media as recited in claim 3, wherein the plurality of predetermined content functionalities of the Web page includes one or more content functionalities related to on-line product searching.

6. The readable media as recited in claim 3, wherein the plurality of predetermined content functionalities of the Web page includes one or more content functionalities related to on-line product ordering.

* * * * *